United States Patent [19]

Shields

[11] 4,143,775

[45] Mar. 13, 1979

[54] APPARATUS FOR DISPATCHING LUMBER

[75] Inventor: Dean W. Shields, Birmingham, Ala.

[73] Assignee: The Filer and Stowell Company, Milwaukee, Wis.

[21] Appl. No.: 781,978

[22] Filed: Mar. 28, 1977

[51] Int. Cl.² .............................................. B65G 47/90
[52] U.S. Cl. ................................... 414/330; 198/613; 198/803; 414/680
[58] Field of Search ................. 214/1 R, 1 BD, 1 BT, 214/147 T, 8.5 R, 8.5 A, 8.5 F, 8.5 G, 8.5 H, 1 P, 1 PB; 198/480, 481, 611, 612, 613, 803

[56] References Cited

U.S. PATENT DOCUMENTS

| 2,609,095 | 9/1952 | Graham et al. | 214/1 PB X |
| 3,124,257 | 3/1964 | Price et al. | 214/1 BD |
| 3,294,256 | 12/1966 | Nazali et al. | 214/1 BD |
| 3,531,001 | 9/1970 | Lunden | 214/8.5 G X |
| 3,627,099 | 12/1971 | Shaffer | 198/480 X |

FOREIGN PATENT DOCUMENTS

| 559614 | 7/1958 | Canada | 214/1 P |
| 559233 | 9/1932 | Fed. Rep. of Germany | 198/490 |
| 46668 | 4/1966 | Fed. Rep. of Germany | 198/480 |
| 950757 | 2/1964 | United Kingdom | 214/1 BD |

Primary Examiner—Frank E. Werner
Attorney, Agent, or Firm—Woodford R. Thompson, Jr.

[57] ABSTRACT

Apparatus for dispatching boards of lumber from packages of sawn boards delivered to at least one predetermined position. At least one arm is pivotally supported adjacent one end at a pivot point with its other end being rotatable around the pivot point. A dispatch pan mounted for rotation at the other end of said arm has a face at its forward side, as viewed in the direction of rotation of said arm, disposed to engage at least one board adjacent said first position and transfer it to a preselected position at an angular distance from said first position. Controlled means rotates the arm about its pivot point to move the dispatch pan from said first position to preselected positions and subsequently around to said first position to start another cycle of operation.

4 Claims, 6 Drawing Figures

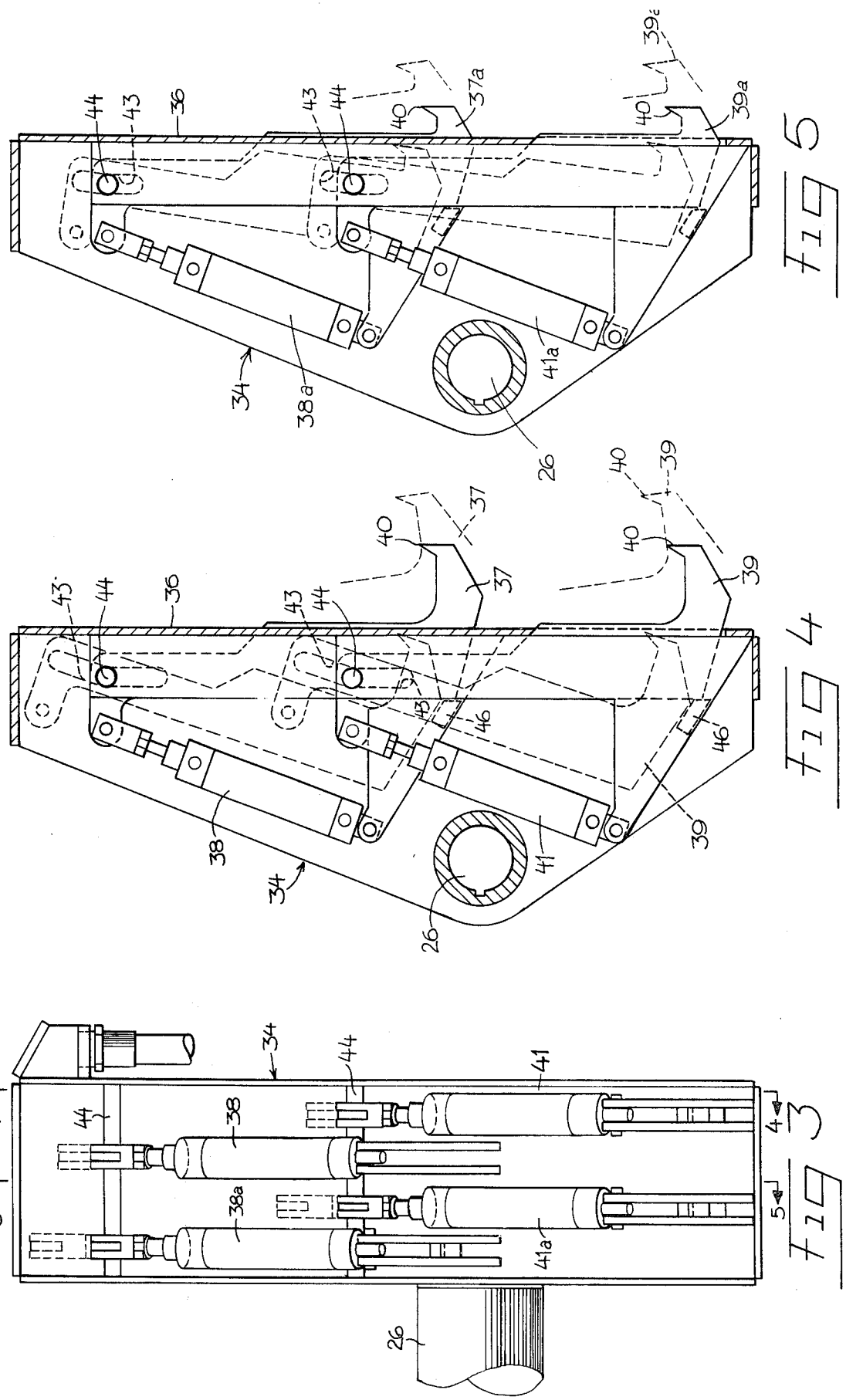

:

APPARATUS FOR DISPATCHING LUMBER

BACKGROUND OF THE INVENTION

This invention relates to apparatus for dispatching lumber from a package of sawn boards and more particularly to such apparatus which utilizes the gap-time in addition to the run-time of the piece being sawn to complete its cycle, thus permitting continuous end-to-end feeding.

Heretofore in the art to which my invention relates, difficulties have been encountered in dispatching boards of lumber from a sawn package thereof due to the fact that the mechanism for dispatching the boards recrosses the lumber path as the lumber moves to the dispatch location. Also, apparatus heretofore employed for dispatching boards of lumber from a sawn package thereof have been complicated in structure and time-consuming in operation.

SUMMARY OF THE INVENTION

In accordance with my invention, I provide apparatus for dispatching boards of lumber from a package of sawn boards in which a rotary dispatch unit sweeps the outfeed section clear of all sawn stock in one motion with each piece or board of lumber being dispatched to its destination. The rotary dispatch unit then is rotated further to return to a start position to commence another cycle of operation without recrossing the path of movement of the lumber to the dispatch location. I thus provide an off-line dispatch system which permits the use of gap-time in addition to run-time of the next piece of lumber for dispatch rather than the gap-time only between pieces of lumber. This additional time allows complete dispatching and at the same time the full feed capacity of the resaw is utilized. The rotary dispatch unit embodies a dispatch pan which is mounted for rotation adjacent the outer portion of the rotary dispatch unit and is provided with a face at the forward side thereof, as viewed in the direction of rotation of the rotary unit, in position to engage at least one board and transfer it an angular distance to a preselected position. Means is provided to maintain the face of the dispatch pan at a constant angular position upon rotation of the rotary dispatch assembly so that at all positions of the dispatch pan the face extends in planes parallel to each other. At least one board engaging member is carried by the dispatch pan and is adapted to project from the face of the pan in position to engage a board and transfer it an angular distance to a preselected position.

BRIEF DESCRIPTION OF THE DRAWINGS

Apparatus embodying features of my invention is illustrated in the accompanying drawings, forming a part of this application, in which:

FIG. 3 is an enlarged view taken generally along the line 3—3 of FIG. 2 showing the trailing side of the dispatch pan, with the supporting shaft therefor being broken away;

FIG. 4 is a sectional view taken generally along the line 4—4 of FIG. 3;

FIG. 5 is a sectional view taken generally along the line 5—5 of FIG. 3; and,

DETAILED DESCRIPTION

Figure 1:
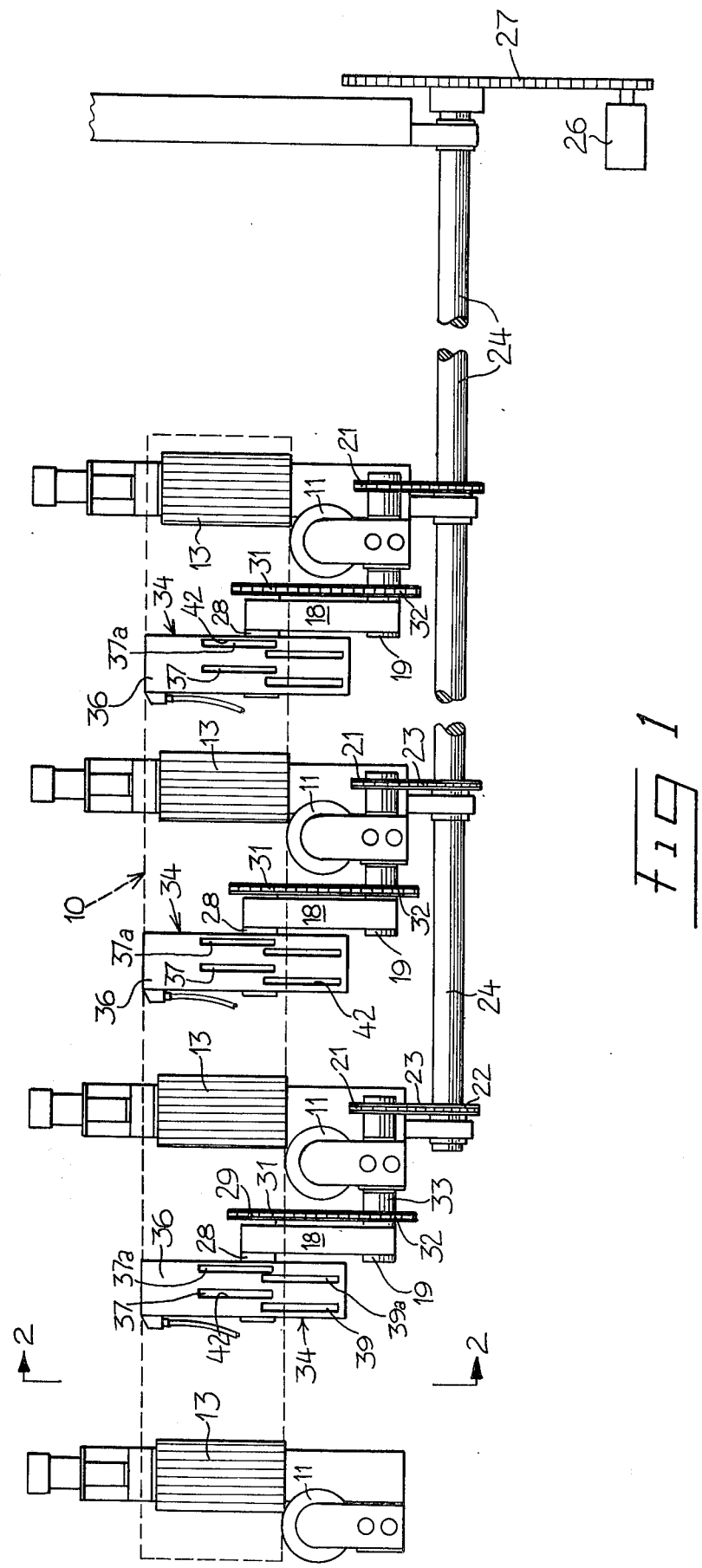
FIG. 1 is a side elevational view, partly broken away and taken generally along the line 1—1 of FIG. 2 showing a plurality of rotary dispatch units mounted in spaced relation to each other and longitudinally of a package of sawn boards, indicated in dotted lines.
Figure 2:
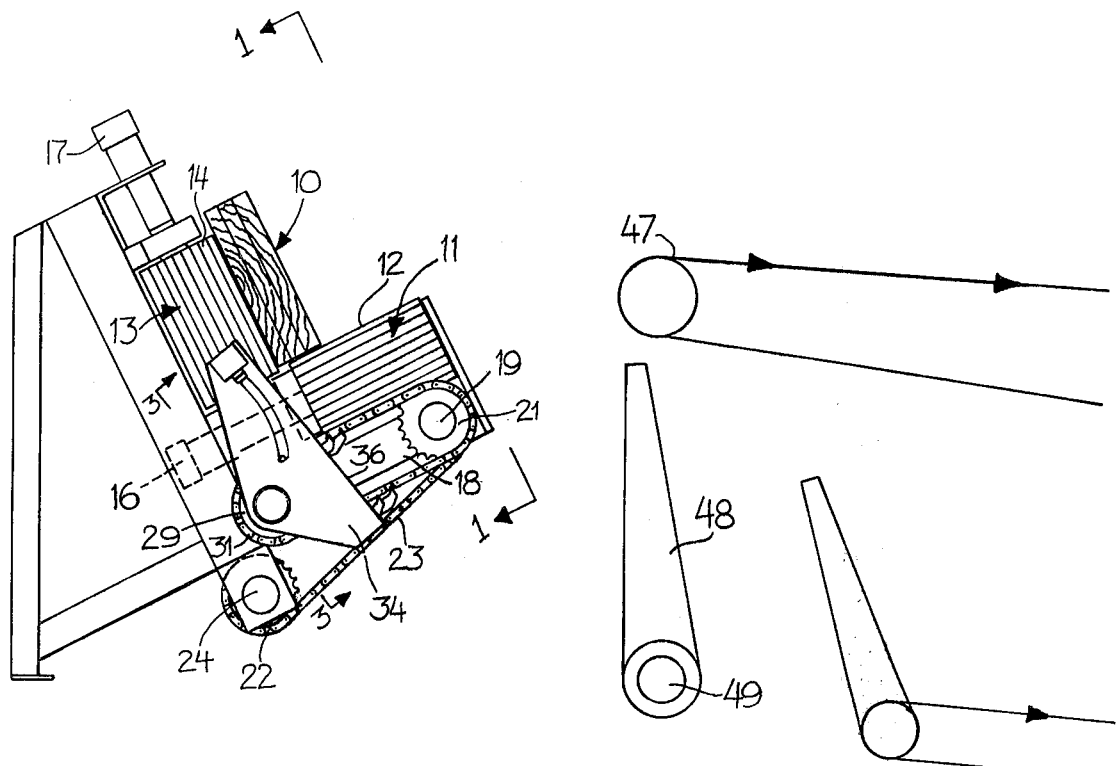
FIG. 2 is an end elevational view taken generally along the line 2—2 of FIG. 1.

Referring now to the drawings for a better understanding of my invention, I show in FIG. 1 the outfeed section of a twinband resaw unit with the package of sawn boards being indicated in dotted lines at 10. Packages of sawn boards 10 are delivered sequentially to the position shown in FIG. 1 by lower driven rolls 11 having upper board supporting surfaces 12 which are inclined in an upward direction away from the initial dispatch position of the package of sawn boards 10, as shown in FIG. 2, and side driven rolls 13 having inclined board engaging surfaces 14 which extend generally perpendicular to the board supporting surfaces 12 of the driven rolls 11. By providing inclined board supporting surfaces 12 and board engaging surfaces 14, the package of boards 10 is supported in an inclined position, as shown in FIG. 2, whereby the package remains in contact with the side rolls 13 as they move to the initial dispatch position in FIGS. 1 and 2. The lower driven rolls 11 are driven by a suitable motor 16 while the side driven rolls 13 are driven by a suitable motor 17.

As shown in FIGS. 1 and 2, a plurality of arms 18 are mounted in spaced relation to each other and longitudinally of the packages of sawn boards 10 delivered to the initial dispatch position shown in FIG. 1. Each arm 18 is secured at its inner end to a shaft 19 which is mounted for rotation in a suitable bearing unit. As shown in FIGS. 1 and 2, a sprocket 21 is secured to the shaft 19 and is operatively connected to a sprocket 22 by a chain 23. Each sprocket 22 is mounted on a drive shaft 24 which is supported in suitable bearings, as shown. The shaft 24 is operatively connected to a controlled power unit 26 by a sprocket and chain assembly 27.

Mounted for rotation in suitable bearings adjacent the free end of each arm 18 is a transverse shaft 28 which carries a sprocket 29. A sprocket chain 31 passes around sprocket 29 and a sprocket 32 mounted on each shaft 19. The sprockets 29 and 32 are of the same diameter whereby the drive ratio is one-to-one. Each sprocket 32 is secured rigidly to a stationary member 33 which in turn is mounted on a stationary part of the supporting frame whereby there is no rotation of each sprocket 32 as the other sprocket 29 rotates about the longitudinal axis of the shaft 19.

Secured to each shaft 28 is a dispatch pan 34 having a face 36 at the forward side thereof, as viewed in the direction of rotation of the arm 18, which is adapted to engage at least one board of a package of sawn boards 10 after the package is moved to the initial dispatch position shown in FIGS. 1 and 2. In view of the fact that each sprocket 32 is stationary and the sprocket 29 carried by the free end of the arm 18 rotates about the pivot point defined by the axis of rotation of each shaft 19, the face 36 of each dispatch pan 34 is maintained at a constant angular position upon rotation of the outer end of arm 18 about its pivot point whereby at all positions of the dispatch pan 34 the face 36 extends in planes parallel to each other, as clearly shown in FIG. 6. Accordingly, each dispatch pan 34 assumes the various positions shown in FIG. 6 as it is rotated about the axis of rotation of its shaft 19. The face 36 of each dispatch pan 34 is thus adapted to sweep the boards of lumber from the package of sawn boards 10 from the initial dispatch position shown in FIG. 2 to preselected positions located at angular distances from the initial dispatch position upon rotation of its arm about its pivot point. By mounting a plurality of the arms 18 on drive shafts 19 which are in axial alighment with each other, all of the dispatch pans 34 rotate in unison about the axis of rotation of the shaft 19.

As clearly shown in FIGS. 4 and 5, each dispatch pan 34 carries one or more board engaging members which are adapted to project from the face 36 in position to engage a board from the package of sawn boards 10 adjacent the initial dispatch position shown in FIG. 2 and transfer it to a preselected position located an angular distance from the initial dispatch position upon rotation of the dispatch pan. In the drawings, I show a pair of upper, laterally spaced board engaging members 37 and 37$^a$ which are actuated by penumatic operated power units 38 and 38$^a$, respectively. Mounted at an elevation below the board engaging members 37 and 37$^a$ are board engaging members 39 and 39$^a$ which are actuated by pneumatic power units 41 and 41$^a$. As shown in FIGS. 4 and 5, the board engaging members are each provided with a hook-like lower end having an upturned barb 40 at the outer end thereof. Also, suitable vertically extending slots 42 are provided in each face 36 for passing the board engaging members 37, 37$^a$, 39 and 39$^a$. As shown in FIGS. 4 and 5, the board engaging members 37 and 39 are longer than the board engaging members 37$^a$ and 39$^a$ whereby the members 37 and 39 are adapted to accommodate thicker boards than the members 37$^a$ and 39$^a$. For example, the board engaging members 37 and 39 may be adapted to handle all boards over four inches in thickness while the members 37$^a$ and 39$^a$ would handle boards of a thickness less than four inches.

In view of the fact that the pneumatic power units 38, 38$^a$, 41 and 41$^a$ are all substantially identical in construction and operation, the description of only the board engaging member 39 and its pneumatic power unit 41 will be given herein. As shown in FIG. 4, the board engaging member 39 is adapted to move from an inner dotted line position within the confines of the face 36 and to an outer dotted line position in which it projects from the face 36. An elongated, upstanding slot 43 is provided in the upper portion of each board engaging member in position to receive a transverse pin 44 which is carried by the dispatch pan 34 whereby the board engaging member 39 is adapted to move relative to the transverse pin. The upper end of each pneumatic operated power unit is operatively connected to the upper portion of its board engaging member and is disposed to move the upper portion of the board engaging member selectively upward toward the face 36 and downwardly away from the face 36 so that upon upward movement of the board engaging member the lower end thereof is retracted within the face 36 to the inner dotted line position and upon downward movement of the board engaging member, the lower end thereof is moved outwardly of the face 36 of the dispatch pan 34 to the outermost position shown.

As shown in FIGS. 4 and 5, stop members 46 are carried by the dispatch pan 34 in position to limit inward movement of the lower end of each of the board engaging members 37, 37$^a$, 39 and 39$^a$ while the board engaging member is in its downward position whereby the board engaging member remains outwardly of the face 36 while the board engaging member is in its downward position. Since the board engaging members are each actuated by pneumatic, power operated units, the board engaging members each float to sense the location of the lower edge of the board engaged thereby. That is, since the board engaging members 37, 37$^a$, 39 and 39$^a$ are each urged outwardly by pneumatic means, the board engaging member is first moved outwardly to the outermost dotted line position shown in FIGS. 4 and 5. As the board engages the hook-like lower end of the board engaging member, the board engaging member is adapted to assume a position to accommodate the particular portion of the board adjacent thereto. Accordingly, if the board is bowed outwardly from the face 36, the barb 40 would be outwardly toward the outermost dotted line position. On the other hand, if the board is straight or bowed inwardly, the board engaging member would be forced inwardly toward the face 36 by the pressure exerted by the lower edge of the board. Accordingly, the board engaging members are adapted to accommodate boards even though the lower edge of the board does not extend in a common plane throughout the length thereof.

As shown in FIGS. 2 and 4, the invidividual boards of lumber from the package of sawn boards 10 may be transferred to an endless conveyor, indicated diagrammatically at 47 or may fall between the endless conveyor 47 and the outer ends of the supporting rolls 11. To further separate the individual boards if desired, a gate member 48 is pivotally supported on a shaft 49 whereby it is adapted to move selectively to the solid line position and the dotted line position shown in FIG. 6. While in the dotted line position, the boards discharged between the roller 11 and the conveyor 47 fall to the left side of the gate 48, as viewed in FIGS. 2 and 6. On the other hand, with the gate 48 in the solid line position, the boards would be deflected toward the right, as viewed in FIG. 6. A second gate member 51 is mounted for pivotal movement on a shaft 52 for movement selectively to the solid line position and the dotted line position shown in FIG. 6. While the gate member 51 is in the dotted line position, the boards delivered to the right side of the gate member 48 would be discharged downwardly between the gates 48 and 51. On the other hand, when the gate member 51 is in the solid line position, the boards deflected thereon from the gate member 48 would be transferred onto an endless conveyor indicated diagrammatically at 53. It will thus be seen that boards delivered to the endless conveyor 47 could be transferred to an edger or trimmer while the boards discharged between the roller 11 and the gate member 48 could be transferred to trash or to a chipper. The boards conveyed to the right side of the gate member 48 and discharged between the gate member 48 and gate member 51 could run around to the saw assembly. The boards passing over the gate member 51 while it is in the solid line position could be transferred to the endless conveyor 53 and then transferred to an edger or trimmer or other disposal could be made thereof.

Figure 6:
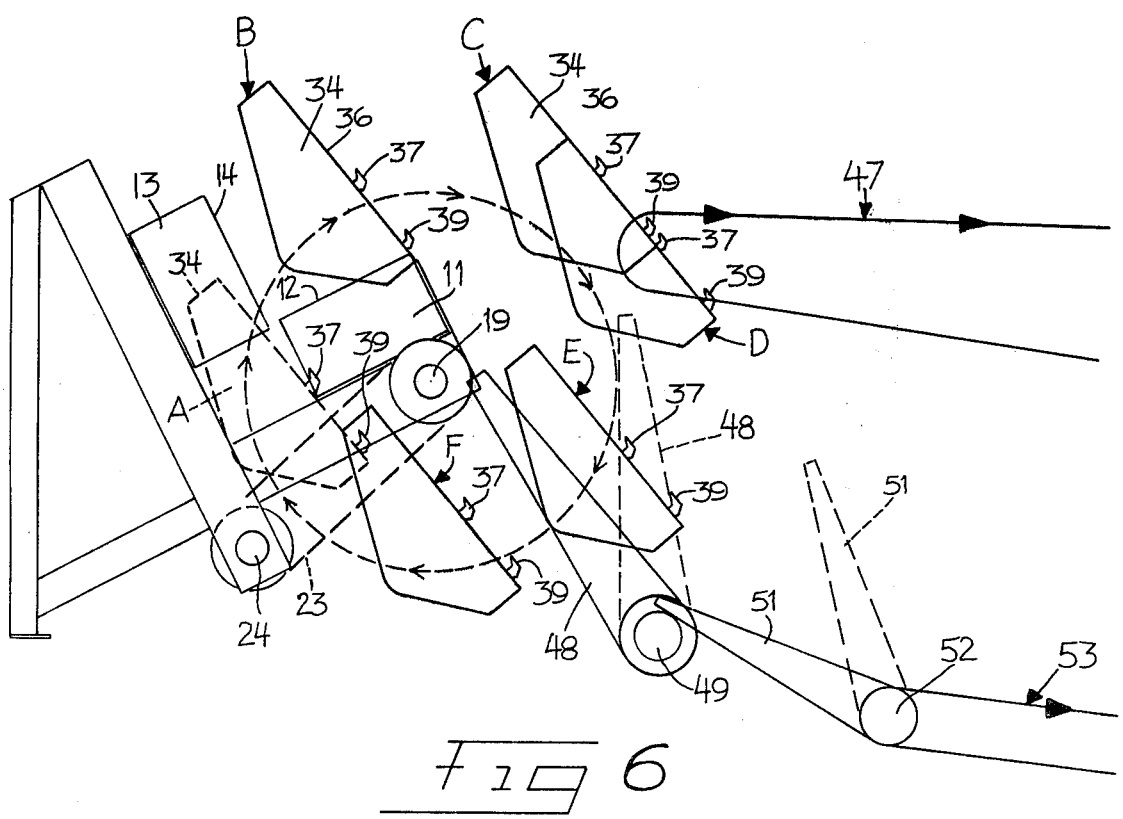
FIG. 6 is a diagrammatic view showing various positions assumed by the dispatch pan as it makes one complete revolution to clear all of the sawn stock from the outfeed section.

In FIG. 6 of the drawings, I show various positions of the dispatch pan 34 during one cycle of operation of the rotary dispatch unit. Position "A" shows the dispatch pan 34 in the "ready" position just prior to commencing a cycle of operation. Position "B" shows the dispatch pan 34 in a position for the lower edge thereof to be adjacent the outer end of the supporting roller 11 whereby boards not hooked by the board engaging members 37, 37$^a$, 39 and 39$^a$ would be swept off the end of the supporting roller whereupon they would fall between the roller and the conveyor 47 and then pass to the left or right side of the gate member 48, depending upon the position of gate member 48. Position "C" shows the dispatch pan 34 in position to discharge any board hooked by the lower board engaging member 39 or 39$^a$ onto the endless conveyor 47. Position "D" shows the dispatch pan in position to discharge any board hooked by the upper board engaging member 37 or 37$^a$ onto the endless conveyor 47. Positions "E" and "F" show the dispatch pan 34 in intermediate positions as it travels to its original "ready" position shown in FIG. 6.

Preferably, the control of my improved rotary dispatch system is accomplished by a digital mini-computer. In view of the fact that such equipment is conventional and well known in the art, no further description thereof is deemed necessary. After selecting the sawing pattern, the operator selects and keys in, by a single push-button, the entire dispatch plan which is also stored and retrieved by the computer. The operator then turns his attention to the loading and positioning of the next piece of stock, thus further facilitating the operation of my improved equipment.

From the foregoing description, the operation of my improved rotary dispatch system will be readily understood. The package of sawn boards 10 are delivered to the initial dispatch position shown in FIG. 2. Where it is desired to drop one or more boards off the end of the supporting roller 11 whereby it falls between the roller 11 and the endless conveyor 47, the board engaging members 37, 37$^a$, 39 and 39$^a$ remain within the confines of the dispatch pan 34. Accordingly, as the dispatch pan 34 reaches position "B", the boards not engaged by the board engaging members drop between the roller 11 and the conveyor 47. For example, pieces of lumber to be sent to scrap or to the chipper fall between the roller 11 and the conveyor 47 and to the left of the gate member 48. In the "ready" position, the board engaging members are actuated or remain within the confines of the dispatch pans, as required, to pick up none, one or two pieces of lumber on the board engaging members. That is, as the pan 34 is rotated in a clockwise direction, as viewed in FIG. 2, the upper hook 37 or 37$^a$, as the case may be, engages the board nearest the side roller 13. Upon continued rotation of the pan 34, the lower board engaging member 39 or 39$^a$, as the case may be, engages the lower edge of the second piece of lumber, as viewed from the side roller 13. In this position, the first piece of lumber engaged by the board engaging member 37 or 37$^a$ is lifted to an elevation above the edge of the second piece of lumber engaged by the board engaging member 39 or 39$^a$. Continued rotation of the dispatch pan 34 to position "B" sweeps off all boards not engaged by the board engaging members between the supporting roller 13 and the conveyor 47 whereby scrap pieces of lumber are conveyed between the roller 11 and the left side of the gate member 48 to a chipper or the trash. Where the boards discharged off the end of the supporting member 11 are not to go to the chipper or to trash, the gate member 48 is moved to the solid line position shown in FIG. 6 whereby the board or boards are then conveyed to the right of the gate member 48 over the gate member 51 to conveyor 53 or may be discharged between the gate member 48 and the member 51 while the gate member 51 is in the dotted line position shown in FIG. 6. Upon movement to position "C", the lower board engaging member 39 or 39$^a$, as the case may be, is in position to discharge the board supported thereby onto the endless conveyor 47. Upon movement to position "D", the upper board engaging member 37 or 37$^a$, as the case may be, is in position to release the board supported thereby onto the conveyor 47. Where a space is desired between the boards released from the board engaging members, the rotation of arm 18 is stopped momentarily to provide the desired gap between the boards delivered to the conveyor 47. After discharge of the board from the board engaging member 37 or 37$^a$, as the case may be, the dispatch pan 34 moves through positions "E" and "F" to the "ready" position "A" without recrossing the path of movement of the oncoming package of sawn boards. The apparatus is then in position to start another cycle of operation.

From the foregoing it will be seen that I have devised improved apparatus for dispatching lumber. By providing a rotary dispatch system which sweeps the outfeed section clear of all sawn stock in substantially one motion, each piece of lumber is dispatched separately to its destination and at the same time the dispatch pan returns to "ready" position without recrossing the lumber path. Accordingly, my improved apparatus permits the use of gap-time plus run-time of the next package of boards, rather than simply the gap-time between boards. This added time permits complete dispatching and at the same time the full feed capacity of the resaw is utilized. By providing floating board engaging members which are moved to their outermost positions by pneumatic means, the board engaging members sense the position of the lower edge of the board supported thereby regardless of the timber bind. That is, the position of the board engaging member is determined by the position of the adjacent edge of the board supported thereby with the stop member limiting inward movement of the board engaging member whereby it remains in the outer board engaging position. Furthermore, my improved apparatus permits the operator to dispatch the contents of each sawn package of boards to any desired destination, such as to an edger, trimmer, run-around or chipper and any combination of these destinations.

While I have shown board engaging members for engaging only two boards with the remainder of the boards in the package being swept off the end of the supporting roller 11, it will be apparent that a greater number of board engaging members may be employed whereby more than two boards could be picked up and transferred to the endless conveyor 47.

While I have shown my invention in but one form, it will be obvious to those skilled in the art that it is not so limited, but is susceptible of various changes and modifications without departing from the spirit thereof.

What I claim is:

1. Apparatus for dispatching boards of lumber from a package of sawn boards comprising:
    (a) means delivering packages of sawn boards lengthwise sequentially to a first position,
    (b) at least one arm pivotally supported adjacent one end at a pivot point with the other end thereof being adapted for rotation around said pivot point,
    (c) a dispatch pan mounted for rotation adjacent said other end of said arm and having a face at the forward side thereof as viewed in the direction of rotation of said other end of said arm,
    (d) at least one board engaging member mounted for movement within an upstanding slot in said face selectively to a first location within the confines of said face and to a second location in which it projects from said face with said board engaging member being in position to engage at least one board adjacent said first position and transfer it laterally and angularly to a preslected position located an angular distance from said first position upon rotation of said arm about its pivot point, (e) an elongated, upstanding slot in an upper portion of said board engaging member, (f) a transverse pin carried by said pan and extending through said slot, (g) a pneumatic operated power unit operatively connected to the upper portion of said board engaging member and disposed to move said upper portion selectively upwardly toward said face of the dispatch pan and downwardly away from said face so that upon upward movement of said board engaging member the lower end thereof is retracted within said face to said first location and upon downward movement of said board engaging member the lower end thereof is moved outwardly of said face to said second location, and (h) means to rotate said arm about its pivot point to move said dispatch pan from said first position to preselected positions and subsequently around to said first position to start another cycle of operation without recrossing the path of movement of said boards to said first position.

2. Apparatus as defined in claim 1 in which stop means is carried by said dispatch pan in position to limit inward movement of said lower end of said board engaging member while said board engaging member is in its downward position so that said board engaging member remains outwardly of said face while said board engaging member is in its downward position.

3. Apparatus for dispatching boards of lumber from a package of sawn boards comprising:
(a) means delivering packages of sawn boards lengthwise sequentially to a first position,
(b) at least one arm pivotally supported adjacent one end at a pivot point with the other end thereof being adapted for rotation around said pivot point,
(c) a dispatch pan mounted for rotation adjacent said other end of said arm and having a face at the forward side thereof as viewed in the direction of rotation of said end of said arm,
(d) at least one board engaging member carried by said dispatch pan and being movable selectively to a first location within the confines of said face and to a second location in which it projects from said face in position to engage at least one board adjacent said first position and transfer it laterally and angularly to a preselected position located on angular distance from said first position upon rotation of said arm about its pivot point,
(e) a pneumatic operated power unit operatively connected to said board engaging member for moving said board engaging member selectively to said first location and said second location whereby said board engaging member floats to sense the location of the lower edge of the board engaged thereby, and
(f) means to rotate said arm about its pivot point to move said dispatch pan from said first position to preselected positions and subsequently around to said first position to start another cycle of operation without recrossing the path of movement of said boards to said first position.

4. Apparatus as defined in claim 3 in which a plurality of laterally spaced board engaging members are provided to accommodate boards of different thicknesses.

* * * * *